Figure 3:
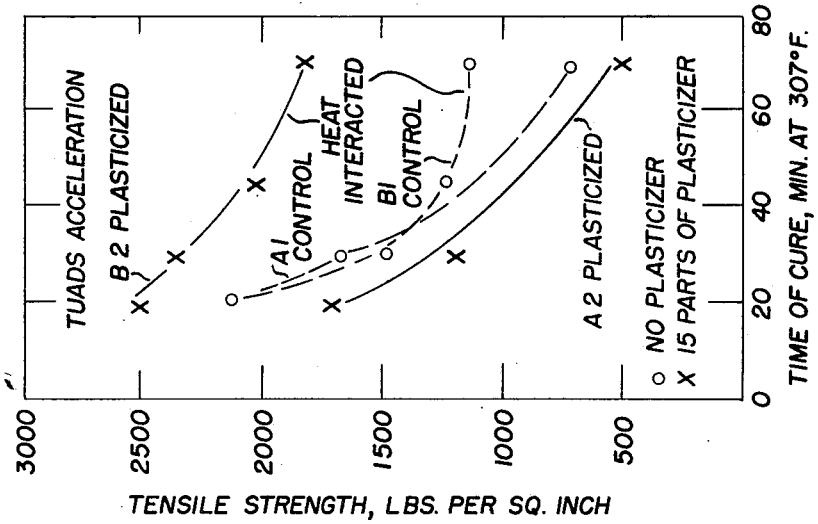

Albert M. Gessler
Francis P. Ford — Inventors

By W. H. Smyers — Attorney

United States Patent Office 2,996,472
Patented Aug. 15, 1961

2,996,472
SYNTHETIC RUBBER COMPOSITIONS AND PREPARATION THEREOF
Albert M. Gessler, Cranford, and Francis P. Ford, Westfield, N.J., assignors to Esso Research and Engineering Company, a corporation of Delaware
Filed Oct. 29, 1954, Ser. No. 465,492
18 Claims. (Cl. 260—33.6)

This invention relates to improved synthetic rubber compositions and to novel methods of preparing same. More particularly, it relates to the preparation of compositions containing a low unsaturation olefin-multiolefin synthetic rubber, of the butyl type, with a particular type of non-oxy carbon black, namely thermal carbon black having a pH of at least 7, and with a plasticizer, these materials being subjected to special treatment and the resulting products having unexpectedly high tensile strength, and other properties.

The term "butyl rubber" has been commercially and technically accepted to denote a low unsaturation olefin-multiolefin synthetic rubber, having an iodine number in the range of about 0.5 to 50, generally commercially about 1 to 10, and a Staudinger mol. wt. above 20,000, e.g. 30,000 to 100,000 as disclosed in Patent 2,356,128. Products of this type, at present marketed under the designation GR-I, are made by copolymerizing 90 to 99% of isobutylene with about 1 to 10% of isoprene in the presence of a diluent, e.g. 1 to 5 volumes of methyl chloride, at low temperature, e.g. about —100° C., using a dissolved Friedel-Crafts catalyst such as aluminum chloride dissolved in methyl chloride. This type of synthetic rubber has a number of advantages over natural rubber and other high unsaturation synthetic rubber such as GR-S (butadiene-styrene) synthetic rubber, diene-nitrile rubber, and polychloroprene rubber, because the low unsaturation of the butyl rubber makes it very resistant to oxidation and other chemical influences. It is therefore relatively free from hardening and cracking during aging. It also has a very low gas permeability, which means it is excellent for holding air in auto tires, etc., whether used as inner tube or as a tubeless tire.

However, there has been some difficulty in obtaining compounded and cured butyl rubber compositions having as high abrasion resistance and good elastic properties, particularly at cold temperatures, as would be desirable. Considerable progress in this respect has been made recently by heat-interacting the butyl rubber with certain types of oxy-carbon black at high temperatures, preferably with agitation, e.g. hot milling, for a sufficient time to develop copolymer-carbon black bonds. For instance, fairly good results are obtained by heat-interacting butyl rubber with channel black, which is a relatively fine carbon black having a surface area generally of about 10 to 15 acres per pound and a relatively high acidity in the range of about 4 to 5 pH. Although furnace blacks, which have an intermediate surface area of about 4 to 8 and an alkaline surface of about 9 to 10 pH, are not suitable per se, fairly good results are obtainable if the furnace black is oxidized to a low pH (e.g. 3 to 5) and then heat-interacted with the butyl rubber. The thermal blacks, which are all relatively coarse, have thus far not given very good results in any of such heat-interacting development work. Thermal blacks have a relatively very low surface area in the range of 1 to 3 acres per pound. Medium thermal and fine thermal have a relatively low structure index of about 50 to 80, generally about 60, compared to the channel blacks and furnace blacks which generally have a structure index in the range of 100 to 120. The thermal blacks which have such low structure index of 60 generally have a high pH in the range of 7 to 9, usually about 7 to 8; there are, however, other thermal blacks, such as lamp black, which have a relatively low pH of 4 and a much higher structure index of about 200, its surface area being about 2 acres per pound.

Plasticizers, such as mineral oils, have been used to some extent in making compounded rubber compositions, partly to obtain some increase in elasticity, and partly to reduce the cost of the overall composition. However, such plasticizers generally behave as mere diluents and therefore usually reduce the strength, e.g. tensile strength, of the rubber, more or less in proportion to the amount of plasticizer used.

Now, according to the present invention, a very surprising phenomenon has been discovered, namely that contrary to the above-mentioned general trend, plasticizers can be used to obtain an increase in tensile strength, in conjunction with heat-interacted compositions containing butyl rubber and thermal carbon blacks having a pH of at least 7.

In order to effect the desired heat-interaction, it is necessary to use a small amount, i.e. 0.10 to 1.0 part, of a heat-interaction promoter, per 100 parts of butyl rubber. One suitable promoter is sulfur, and it may be used in a concentration of about 0.10 and 0.60 part, preferably 0.20 to about 0.40 part. Instead of sulfur, other promoters may be used such as p-dinitroso benzene, m-dinitroso benzene, various quinone dioximes, e.g. p-quinone dioxime, and their derivatives such as quinone dioxime dibenzoate, and other esters, or mixtures of various promoters.

The thermal carbon blacks to be used should only be those having a neutral or mildly alkaline surface, as indicated by a pH of about 7 to 9, preferably about 7 to 8, and with a low structure index, e.g. about 50 to 80, and a low surface area of about 1 to 3 acres per pound or a particle size of about 100 to 300 millimicrons in diameter. Specific examples are fine thermal (FT) which generally has a pH of 8, surface area of 3 acres per pound and structure index 60; and medium thermal (MT) which has pH 7, surface area 1 acre per pound and structure index 60. A number of such materials are available on the market, such as P-33 which is a fine thermal and Thermax which is a medium thermal.

The arithmetic value K of the $$\frac{\text{acres/lb.} \times \text{structure index}}{\text{pH}}$$

should be about 5 to 30. For fine thermal, $K=22.5$ $$\left(\text{i.e.} \frac{3 \times 60}{8}\right)$$

and for medium thermal, $K$=about 8.5

$$\left(\text{i.e.}\frac{1\times 60}{7}\right)$$

The amount of this carbon black to be used should be about 20 to 150 parts by wt. per 100 parts of butyl polymer, and generally the best commercial results are obtained with about 40 to 80, e.g. specifically 50, parts per 100 of polymer.

Although in the case of heat-interaction of butyl rubber with channel black or oxidized furnace black, the addition of a plasticizer prior to or during the heat-interaction seriously interferes with the heat-interaction, and the only way that a plasticizer can be used at all is to add it after the heat-interaction has been completed. It has been found that with the high pH thermal blacks of the present invention, the plasticizer may be successfully added either before, during or after the heat-interaction with the butyl rubber.

The type of plasticizer to be used may be any relatively non-volatile organic liquid which is inert chemically and sufficiently compatible with the butyl rubber-carbon black mixture to not separate therefrom after curing. Suitable materials include hydrocarbon oils, especially petroleum oils of the kerosene to lubricating oil or higher boiling range, preferably oils having a viscosity of about 30 to 300 seconds Saybolt Universal at 210° F. One may use such oils derived from various paraffinic, naphthenic or asphaltic crude base stocks, or mixtures of different base stocks or separate fractions of any desired base stock, such as various distillate fractions or solvent extracts, etc. Instead of hydrocarbon oils, one may use ester type oils such as trioctyl phosphate, dioctyl and di-isooctyl phthalates, octyl adipates, and corresponding hexyl, heptyl, and decyl esters, and butyl cellosolve pelargonate, etc.

The amount of such plasticizer to be used may be from 1 to 50 parts, preferably about 5 to 30 parts, per 100 parts of copolymer. The optimum amount of plasticizer appears to vary from about 10 to 20 parts (per 100 of copolymer), depending upon the type and proportion of the materials used, as well as conditions used in effecting the heat-interaction and the final vulcanization.

The heat-interaction of the butyl rubber with the thermal carbon black may be carried out in various ways, depending upon equipment and time available, but in general the temperature to be used should be from 250–450° F., inversely for a time ranging from about 8 hours to 10 minutes. If agitation is used, such as hot milling, then less time is required than in the case of static heating. The following brief table may be used as a general guide of the desirable temperature/time relations.

| Temp. (° F.) | Time | |
|---|---|---|
| | Hot Milling | Static Heating |
| 250 | 1-4 hrs. | 5-8 hrs. |
| 320 | 30-60 min. | 3-6 hrs. |
| 380 | 20-40 min. | 2-4 hrs. |
| 450 | 10-20 min. | 1-2 hrs. |

Another way of expressing these relationships is to say that for hot milling, the time, in minutes, equals $$\frac{2,000 \text{ to } 10,000}{\text{Temp. (° F.)} - 210}$$

In the case of static heating, the time, in minutes, equals $$\frac{12,000 \text{ to } 50,000}{\text{Temp. (° F.)} - 210}$$

It is understood, of course, that intermediate times of heating may be used where either lesser amount of agitation is used continuously, or combinations of part static heating and part mastication are used, or alternate cycles of each. As a general overall guide, it may be said that the time of heating, in minutes, equals $$\frac{2,000 \text{ (with agitation) to } 50,000 \text{ (without agitation)}}{\text{Temperature (° F.)} - 210}$$

The details and advantages of the invention will be better understood from the following experimental data and the accompanying charts.

A large number of tests were made in which a commercial butyl rubber, GR–I–17, was compounded with 50 parts by weight of fine thermal black per 100 parts of butyl rubber and treated in various ways with and without heat-interaction, and with 5 and 15 parts of plasticizer, as well as control tests without any plasticizer. In order to determine the effect of these variables on the time of cure, or the sensitivity of the composition for over-curing, various batches were cured for different lengths of time, generally 20, 30, 45 and 60 or 70 minutes at 307° F. The vulcanization was effected by sulfur and some of each of two ultra accelerators, namely, Tuads (tetramethyl thiuram disulfide) and Altax (benzothiazyl disulfide), except a few tests (so indicated) where only Tuads was used.

Master batches of polymer, carbon block, and stearic acid were prepared in a 00 Banbury mixer. Sulfur (when used as promoter for the heat-interaction, but in the absence of vulcanization accelerators) was added in identical concentration to portions (301 grams) of each of these master batches on a 6 in. x 12 in. mill. For the batches which were subjected to heat-interaction, the procedure used was to heat the composition (in the form of sheets about ¼ in. thick and about 6 x 12 in. in size), ½ hr. in open steam at 320° F., followed by 5 min. of milling under standard conditions (6 x 12 in. mill, 0.040–0.045 in. roll clearance, and 80–90° F. initial roll temperature), and repeating this heat-mill cycle twelve times. This gave a total static heating time of 6 hrs. Vulcanizing agents were added in each case during the final milling period of the last cycle.

The butyl rubber used throughout the tests, unless otherwise specified was GR–I–17, which is an isobutylene-isoprene copolymer having an 8 minute Mooney viscosity at 210° F. of about 59, and a mole percent unsaturation of about 1.48.

The fine thermal black used was a product marketed under the designation P–33.

The plasticizer used, unless otherwise designated, was an acid-treated paraffinic petroleum oil having a viscosity of about 40 seconds Saybolt Universal at 210° F., called Forum 40.

The compounding formulation used was as follows:

| Material: | Parts by weight |
|---|---|
| Banbury master batch— | |
| Butyl rubber | 100.0 |
| Fine thermal black (P–33) | 50.0 |
| Stearic acid | 0.25 |
| Sulfur (when used as promoter) | 0.30 |
| Vulcanizing agents— | |
| Zinc oxide | 5.0 |
| Sulfur | 2.0 |
| Tuads (tetramethyl thiuram disulfide) | 1.0 |
| Altax (benzothiazyl disulfide) | 1.0 |

After the various compositions were vulcanized they were tested for stress/strain relationships (stress determined at consecutive 100% elongations, up to the final tensile strength and elongation at break). The compositions which were cured for 45 minutes were tested for elastic and internal viscosity properties by the free vibration method with a Yerzley oscillograph at 270° C.

The data obtained are shown in the following table:

*Table 1*

| Min. Cured at 307° F. | Procedure 850-54 | Part A—Cured with 1.0 Tuads, 1.0 Altax | | | | | | Part B—Cured with 1.25 Tuads | | | | | |
|---|---|---|---|---|---|---|---|---|---|---|---|---|---|
| | | Conventionally Mixed | | | Heat-Treated | | | Conventionally Mixed | | | Heat-Treated | | |
| | | 1 | 2 | 3 | 7 | 8 | 9 | 4 | 5 | 6 | 10 | 11 | 12 |
| | Parts Oil | 0 | 5 | 15 | 0 | 5 | 15 | 0 | 5 | 15 | 0 | 5 | 15 |
| 20 | Mod. at (p.s.i.): | | | | | | | | | | | | |
| | 100% | 155 | 155 | 110 | 145 | 105 | 75 | 150 | 120 | 100 | 115 | 100 | 60 |
| | 200% | 250 | 200 | 165 | 300 | 250 | 160 | 250 | 210 | 155 | 260 | 220 | 150 |
| | 300% | 310 | 265 | 240 | 520 | 410 | 305 | 350 | 290 | 225 | 490 | 400 | 290 |
| | 400% | 390 | 345 | 290 | 740 | 605 | 445 | 440 | 355 | 275 | 725 | 590 | 405 |
| | 500% | 545 | 480 | 400 | 975 | 790 | 575 | 565 | 475 | 350 | 980 | 775 | 545 |
| | 600% | 1,050 | 950 | 750 | 1,375 | 1,190 | 865 | 955 | 800 | 550 | 1,400 | 1,195 | 790 |
| | 700% | | | | | | | 1,950 | 1,635 | 1,250 | 1,990 | 2,000 | 1,450 |
| | Ten. St. #/In.² | 1,385 | 1,800 | 1,425 | 2,085 | 2,265 | 2,450 | 2,100 | 1,635 | 1,700 | 2,220 | 2,550 | 2,525 |
| | Percent Elongation | 650 | 700 | 700 | 695 | 745 | 835 | 710 | 700 | 755 | 725 | 785 | 855 |
| 30 | Mod. at: | | | | | | | | | | | | |
| | 100% | 175 | 155 | 125 | 160 | 125 | 100 | 155 | 140 | 100 | 140 | 125 | 75 |
| | 200% | 295 | 250 | 210 | 370 | 300 | 220 | 280 | 240 | 175 | 325 | 260 | 190 |
| | 300% | 365 | 340 | 285 | 625 | 490 | 375 | 380 | 320 | 250 | 580 | 450 | 325 |
| | 400% | 490 | 415 | 360 | 830 | 645 | 500 | 500 | 400 | 310 | 810 | 635 | 450 |
| | 500% | 750 | 690 | 560 | 1,095 | 890 | 690 | 655 | 550 | 425 | 1,075 | 850 | 600 |
| | 600% | | | | | | 1,150 | 1,260 | 959 | 800 | | 1,350 | 975 |
| | Ten. St. #/In.² | 1,200 | 690 | 760 | 1,270 | 1,400 | 2,140 | 1,650 | 1,250 | 1,170 | 1,450 | 2,375 | 2,350 |
| | Percent Elongation | 575 | 500 | 530 | 545 | 590 | 730 | 650 | 640 | 660 | 595 | 720 | 785 |
| 45 | Mod. at: | | | | | | | | | | | | |
| | 100% | 200 | 160 | 150 | 190 | 150 | 110 | 165 | 150 | 100 | 150 | 130 | 100 |
| | 200% | 330 | 280 | 245 | 440 | 350 | 260 | 300 | 260 | 200 | 360 | 295 | 225 |
| | 300% | 445 | 370 | 325 | 700 | 540 | 410 | 420 | 355 | 290 | 650 | 500 | 360 |
| | 400% | 595 | 500 | 440 | 945 | 710 | 550 | 550 | 455 | 355 | 895 | 690 | 500 |
| | 500% | | | | | 1,050 | 800 | | 655 | 525 | 1,160 | 945 | 675 |
| | 600% | | | | | | 1,400 | | | | | 1,580 | 1,160 |
| | Ten. St. #/In.² | 650 | 600 | 550 | 1,000 | 1,090 | 1,800 | 705 | 940 | 990 | 1,200 | 2,035 | 2,025 |
| | Percent Elongation | 420 | 440 | 450 | 425 | 510 | 655 | 490 | 560 | 590 | 515 | 650 | 720 |
| 70 | Mod. at: | | | | | | | | | | | | |
| | 100% | 200 | 175 | 150 | 195 | 150 | 115 | 175 | 155 | 110 | 150 | 145 | 100 |
| | 200% | 350 | 300 | 225 | 465 | 375 | 275 | 305 | 290 | 225 | 400 | 340 | 240 |
| | 300% | 490 | 415 | 355 | 740 | 575 | 445 | 450 | 400 | 300 | 700 | 550 | 400 |
| | 400% | | | | | | 760 | 600 | 510 | 400 | 950 | 750 | 525 |
| | 500% | | | | | | 910 | | 745 | | | 1,050 | 730 |
| | 600% | | | | | | | | | | | | 1,290 |
| | Ten. St. #/In.² | 550 | 510 | 395 | 920 | 975 | 1,435 | 715 | 745 | 515 | 1,100 | 1,700 | 1,800 |
| | Percent Elongation | 355 | 370 | 335 | 380 | 470 | 590 | 470 | 500 | 460 | 455 | 585 | 670 |
| η/×10⁻⁶, Poises×C.P.S | | 1.07 | 0.79 | 0.61 | 0.80 | 0.57 | 0.43 | 1.16 | 0.89 | 0.59 | 0.79 | 0.73 | 0.43 |
| K×10⁻⁸, Dynes/cm.² | | 12.0 | 10.2 | 8.41 | 10.6 | 8.94 | 7.52 | 10.2 | 9.36 | 7.24 | 9.52 | | 4.19 |

Figure 1:
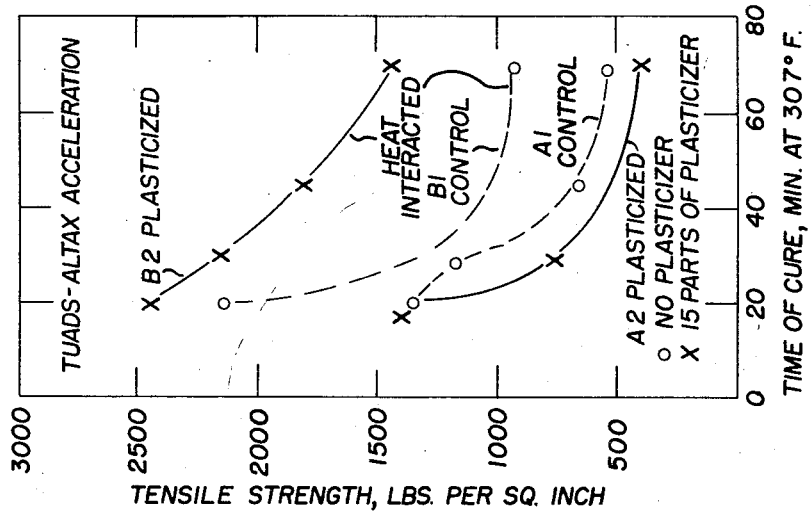

In the accompanying drawings, FIGURE 1 is a chart showing the tensile strength obtained at various times of cure, ranging from 20 min. to 70 min., for compositions of butyl rubber and fine thermal carbon black, both with and without plasticizer, and with and without heat-interaction. The present invention requires both heat-interaction and plasticizer, and is represented by curve B2 which shows the highest tensile strength at any time of cure, ranging from slightly less than 2,500 lbs. per square in. at 20 min. cure down to 1,500 lbs. per sq. inch at 70 min. cure.

Dotted curve B1 is the corresponding control, without plasticizer, but subjected to the same heat-interaction as B2. It is clearly apparent that the plasticizer has not only produced a substantial increase in tensile strength, but it greatly lessens the tendency toward reduction in tensile strength with over-curing.

Curves A2 and A1 show the corresponding results obtained without heat-interaction. Thus, curve A2 shows that without heat-interaction, the plasticizer actually causes a reduction in tensile strength (compare with unplasticized control A1); this is the normal and general diluent effect of a plasticizer. In contrast, the fact that curve B2 is higher, in fact far higher, than curve B1 shows that, contrary to the usual diluent effect of plasticizers, when a plasticizer is used in conjunction with this particular composition of butyl rubber and a thermal carbon black having a pH of at least 7 and the composition is heat-interacted, the plasticizer is exerting a new effect which causes an actual increase in strength. The unexpected superiority of this invention is really best judged by comparing the highest curve B2 with the lowest curve A2, representing both of the plasticized compositions, the one being heat-interacted and the other not. Thus, with the intermediate or normal curing time of 45 minutes, the plasticized heat-interacted composition of this invention gave a tensile strength of about 1,800 lbs. per sq. in., compared to about 600 lbs. per sq. inch for the corresponding plasticized composition which had not been heat-interacted.

Figure 2:
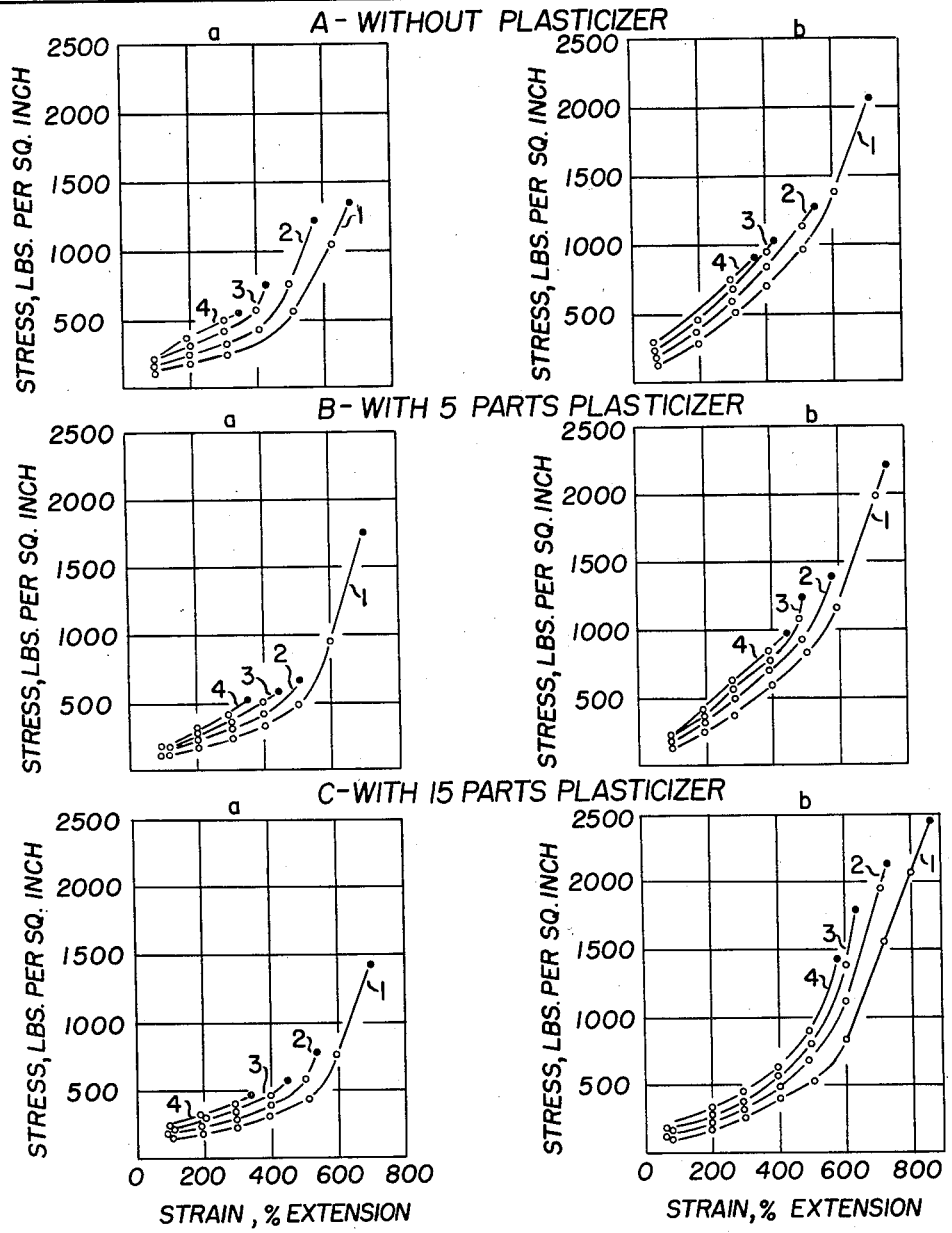

In the accompanying FIGURE 2, there are 6 small charts shown for comparison with each other, in three series representing compositions (A) without plasticizer, (B) with 5 parts plasticizer, and (C) with 15 parts plasticizer. In each of the three series, there are 2 charts representing (a) control compositions which have not been heat-interacted, and (b) corresponding heat-interacted compositions.

In each of the 6 charts there is a series of curves representing the stress (in lbs. per sq. in.) at various consecutive 100% strains (extension). The 4 curves marked 1, 2, 3 and 4, in each chart, represent compositions cured for 20, 30, 45 and 60 minutes respectively at 307° F. These charts in FIGURE 2 show in detail the stress/strain relationships of the compositions already referred to in FIGURE 1, together with additional corresponding data on compositions containing 5% of plasticizer (which were omitted from FIGURE 1 to avoid confusion due to too many curves).

In FIGURE 2, the small solid black circles, which in each case are the highest points of any particular curve, represent the tensile strength and final percent elongation at break. (These points correspond to the tensile strength points shown in FIGURE 1.) The open circles in each curve, starting at the lower left and progressively going toward the upper right in each chart, show the values of modulus or stress/strain relations, as each sample is stretched continuously to the final break.

A great many of these curves appear to be formed in two distinct portions. The rate of stress development, slow in the first portion, is increased sharply in the second portion as the sample is extended beyond about 500 percent. Both portions are linear in the first approximation and the curves might just as well have been drawn with two straight lines intersecting at an apex. Control compounds show this type of behavior to an appreciable extent in the undercured specimens (20 or 30 minutes) only. Heat-interacted compounds show it to a much higher degree, particularly in the samples which contain plasticizer. Two phase stress patterns are always obtained from samples with high tensile strength.

X-ray scans were made at extensions from 100 to 600 percent on some of the samples from this series of tests. Using optical density differences as a basis for measurement, it was found that the onset of high order orientation coincided in each case with the point of rate change in the stress curve. The high order orientation which gives the best results, namely the highest modulus at any particular percent extension and the highest tensile strength over the whole range of curing times from 20 to 60 minutes, as in Chart Cb in FIGURE 2, is due to the combined effect of the plasticizer and heat-interaction.

FIGURE 3 shows a set of curves corresponding to those in FIGURE 1 except that they represent compositions which were cured with only Tuads as vulcanization accelerator, instead of both Tuads and Altax as used in compositions represented in FIGURES 1 and 2.

In FIGURE 3, curve B2, representing the invention, and dotted curve B1 represent the plasticized and control heat-interacted compositions, while curve A2 and dotted curve A1 represent the corresponding plasticized and control compositions which have not been heat-interacted. This chart again shows (by comparing A2 with A1) that without heat-interaction, the plasticizer merely contributes the usual diluent effect and gave compositions of lower strength. However, comparing curve B2 with curve B1, it is seen that when both compositions are heat-interacted, the plasticizer effects a tremendous improvement, giving not only a higher tensile strength at 20 minute cure, but also a relatively much higher tensile strength (less loss in tensile strength) at longer curing times, even up to 70 minutes. Thus, in curve B2, it is seen that a 45 min. cure, the plasticized heat-interacted composition of this invention had a tensile strength of 2,000 lbs./sq. in., whereas the corresponding composition unplasticized but heat-interacted control (B1) had a tensile strength of only 1,200 lbs./sq. in., and the corresponding plasticized non-heat-interacted composition (A2) had a tensile strength of only about 900.

As noted on the chart in FIGURE 3, the amount of plasticizer used in the compositions represented by curve B2, was 15 parts per 100 of butyl rubber, and it is interesting to note (from the data in the above table, but not shown in FIGURE 3), that even 5 parts of plasticizer resulted in compositions giving a curve almost identical with B2 when used with Tuads alone as vulcanization accelerator.

Thus, it is apparent from the above series of tests, that the combination of the use of a plasticizer and heat-interaction in compositions of butyl rubber with a thermal carbon black having a pH of at least 7, produces an expectedly superior results.

Another set of tests was made like those described above, but using Polyac (paradinitrosobenzene) instead of sulfur, as heat-interaction promoter. In these tests, the butyl rubber used was GR–I–15, which has an 8-minute Mooney viscosity of about 48 and a mole percent unsaturation of about 1.68. 100 parts by weight of this butyl rubber was compounded with 50 parts by weight of P–33 (fine thermal carbon black) in a large master batch which was divided into three portions. To one of these three portions was added 0.5 part of Polyac (per 100 parts of butyl rubber), as heat-interaction by 8 hours' exposure in a steam digester at 320° F. At the end of this time this heat-treated master batch was cooled and divided into three parts and mixed, respectively, with 0, 5 and 15 parts (per 100 of butyl rubber) of plasticizer. The plasticizer used was an acid-treated paraffinic petroleum oil distillate having a viscosity of about 40 seconds Saybolt Universal at 210° F. 5 parts of zinc oxide, 2 parts sulfur and 1 part Tuads were also added to each, and cured 40 minutes at 307° F.

For comparison, a corresponding set of three tests was made like the above three but without use of the Polyac promoter during the heat-interaction.

For additional comparison, a corresponding set of three tests was made using a SRF (a semi-reinforcing furnace) carbon black instead of the fine thermal carbon black of

*Table 2*

| | P-33 | | | | | | SRF | | |
|---|---|---|---|---|---|---|---|---|---|
| Percent Oil | 0 | 5 | 15 | 0 | 5 | 15 | 0 | 5 | 15 |
| Promoter | None | | | 0.5 Polyac | | | 0.5 Polyac | | |
| Stress-Strain (40' Cure at 307° F.) Mod. at: | | | | | | | | | |
| 100% | 205 | 175 | 150 | 205 | 200 | 150 | 300 | 270 | 205 |
| 200% | 375 | 340 | 250 | 470 | 440 | 340 | 900 | 765 | 625 |
| 300% | 550 | 450 | 350 | 850 | 740 | 550 | 1,600 | 1,365 | 1,110 |
| 400% | 700 | 600 | 425 | 1,155 | 975 | 740 | 2,115 | 1,830 | 1,490 |
| 500% | | 820 | 600 | | 1,225 | 945 | | | 1,850 |
| 600% | | | 1,040 | | 1,725 | 1,325 | | | |
| Tens. Str. #/In.² | 950 | 1,170 | 1,390 | 1,330 | 1,775 | 1,900 | 2,200 | 2,190 | 1,935 |
| Elongation (percent) | 500 | 565 | 635 | 460 | 615 | 690 | 415 | 500 | 535 |
| Internal Viscosity ηf=10⁻⁵ Yerzley (45' cure at 307° F.) | 7.77 | 11.67 | 13.79 | 8.15 | 5.84 | 4.08 | 11.52 | 10.05 | 6.58 |
| Dynamic Properties (Temp. 50° C.; 16 cycles/sec. at 10% extension): | | | | | | | | | |
| Percent Rel. Damping | 23.75 | 23.75 | 17.8 | 17.0 | 17.8 | 17.0 | 22.25 | 22.5 | 18.75 |
| Dyn. Mod.×10⁻⁷ | 2.79 | 2.52 | 1.58 | 2.10 | 1.87 | 1.43 | 2.83 | 2.30 | 1.74 |
| η×10⁻⁴ | 4.76 | 4.3 | 1.96 | 2.47 | 2.32 | 1.68 | 4.50 | 3.69 | 2.28 | this invention, without any plasticizer, and with 5 and 15 parts of the same mineral oil as mentioned above. In each of these tests 0.5 part of Polyac was used as heat-interaction promoter and all three compositions were subjected to the same heat-interaction treatment described above, and the compositions were then compounded and cured the same as described above.

The data on stress-strain properties, tensile strength, elongation, internal viscosity and dynamic properties are shown in Table 2.

The data in the above Table 2 show that with no heat-interaction promoter, the butyl-P-33 control with no plasticizer added, gave a 300% modulus of 550, and with 5 and 15 parts of oil plasticizer, this modulus was reduced to 450 and 350 respectively. The corresponding tensile strengths for the 0, 5, and 15% oil compositions were 950, 1170, 1390; and the elongations were 500, 565, and 635. Thus, the oil plasticizer caused a reduction in modulus but a slight increase in tensile strength and elongation. Additional tests (not shown in the table) indicate that a corresponding unheat treated control (without plasticizer) gave a 300% modulus of 430, tensile strength of 975 and elongation of 585%.

In the corresponding tests in which Polyac was used as heat-interaction promoter, in compositions containing 0, 5 and 15 parts of oil respectively, the modulus was 850, 740 and 550; the tensile strength was 1330, 1775 and 1900; while the elongation went up from 460 to 615 and 690. The tensile streigth of 1900 lbs./sq. in. obtained in the Polyac-heat-treated composition containing 15 parts of oil in the plasticizer, is extraordinarily high for a butyl rubber composition containing 50 parts of thermal carbon black, which is well known to not have any reinforcing properties. In fact, this figure is remarkably close to the 1935 lbs./sq. in. obtained with the corresponding composition (shown in the above table at the extreme right), in which SRF (a semi-reinforcing black) was used, with 15 parts of oil. It should also be noted that in the SRF set of tests, the tensile strength of the unplasticized control was 2,200, and that 5 and 15 parts of oil reduced this figure to 2190 and 1935, respectively. Thus the oil caused a reduction in tensile strength of the furnace black compositions, whereas it gave an increase in tensile strength of the fine thermal black compositions of this invention. (A corresponding unheat-treated P-33 control, without plasticizer, gave a 300% modulus of 610, tensile strength of 1,000, and elongation of 500.)

It is quite remarkable that the internal viscosity of the P-33 compositions heat treated without Polyac increased from 7.77 to 11.67 and 13.79, with 0, 5 and 15 parts of oil, respectively; whereas in the Polyac-heat-treated compositions, the internal viscosity reduced from 8.15 to 5.84 and 4.08 with the same amount of 0, 5 and 15 parts of oil, thus indicating conclusively that the Polyac promoter is an important factor in the heat-interaction of the butyl rubber and fine thermal black. It is also important to note that in the dynamic properties, the value of $\eta \times 10^{-4}$ in the compositions heat-treated without Polyac decrease only from 4.76 to 4.3 and 1.96 respectively with 0, 5 and 15 parts of oil; whereas in the Polyac-heat-treated compositions, the corresponding values are 2.47, 2.32 and 1.68. It is noted that with corresponding SRF carbon black, the values are much poorer, namely 4.50, 3.69 and 2.28.

Another series of tests was made to show the effect more in detail of the concentration of plasticizer used, and to show that results are obtained both by having the plasticizer present during heat-interaction, as well as adding the plasticizer after heat-interaction. The master batch compounding formula used here is as follows:

| | Parts by weight |
|---|---|
| Butyl rubber (GR-I-17) | 100.0 |
| Fine thermal black (P-33) | 50.0 |
| Stearic acid | 0.25 |
| Polyac | 0.5 |

The above master batch was divided into 11 portions for treatment as follows: 5 portions were compounded with various amounts (5, 10, 15, 20 and 25 parts per 100 of butyl rubber) of plasticizer, using the same mineral oil plasticizer as used in the previously described tests. These 5 samples, and an additional control sample without any plasticizer, were subjected to heat treatment by heating for 4 hours at 320° F. in open steam. 5 other portions of the same master batch were similarly heat-treated, but without any plasticizer, and then compounded with corresponding amounts of 5-25 parts of plasticizer. All 11 compositions were then compounded with 5 parts of zinc oxide, 2 parts sulfur and 1.25 part of Tuads, and cured in 4 x 6 inch pads for 45 minutes at 307° F. The cured test specimens were then tested, with the results given in the following Table 3.

Table 3

| Percent Plasticizer | 0 | 5 | 10 | 15 | 20 | 25 |
|---|---|---|---|---|---|---|
| Plasticizer Added Before Heat-Treatment: | | | | | | |
| Modulus (300%) | 710 | 525 | 440 | 400 | 350 | 300 |
| Tensile Strength | 1,165 | 1,920 | 2,155 | 2,190 | 2,130 | 1,920 |
| Percent Elongation | 470 | 626 | 684 | 708 | 746 | 738 |
| Plasticizer Added After Heat-Treatment: | | | | | | |
| Modulus (300%) | | 535 | 460 | 400 | 350 | 340 |
| Tensile Strength | | 2,090 | 2,175 | 2,180 | 2,030 | 1,900 |
| Percent Elongation | | 668 | 690 | 710 | 744 | 748 |

Figure 4:
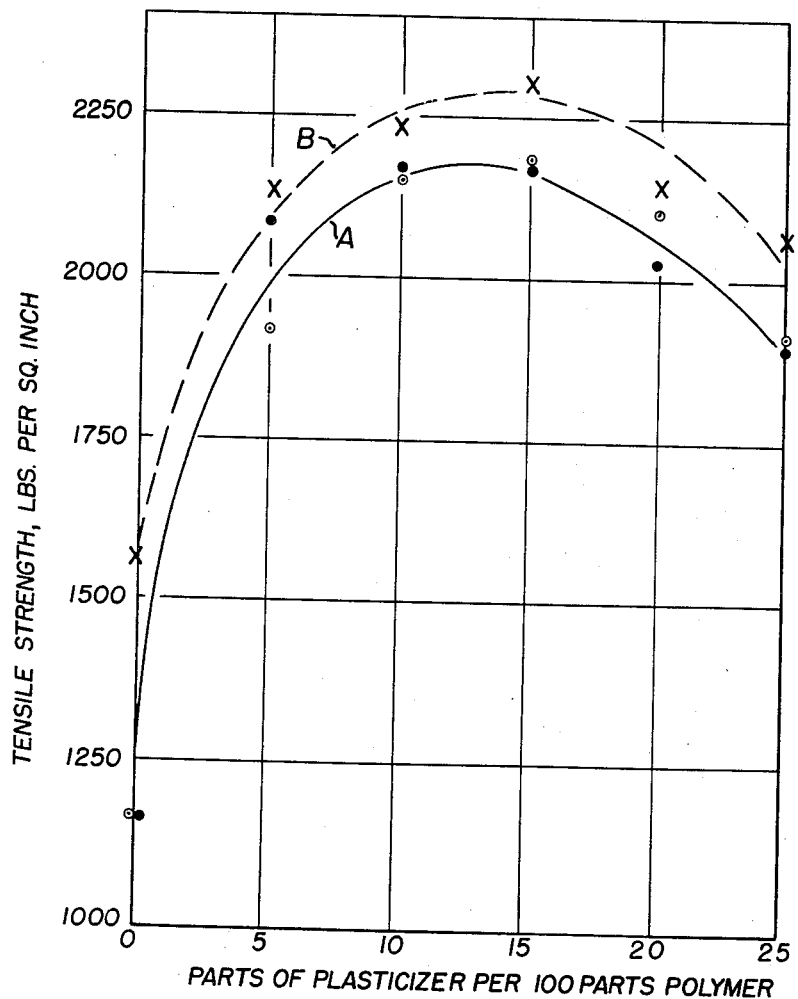

The tensile strength data in the above table are also set forth graphically in the accompanying FIGURE 4 in which the hollow circles of curve A show the tensile strength obtained with various amounts of plasticizer in compositions in which the plasticizer was added before heat-treatment, whereas the solid circles of curve A show corresponding results obtained by adding the plasticizer after the heat-treatment.

These tests show that with no plasticizer, the tensile strength was 1165, and that with increasing concentrations of 5 to 25% of plasticizer added before heat-treatment, the tensile strengths ranged from 1920 at 5% up to 2190 with 15% of plasticizer, and then back down slightly to 1920 with 25% plasticizer. In curve A2, in which the plasticizer was added after heat-treatment, the corresponding tensile strengths increased from 2090 lbs./sq.in. with 5% plasticizer up to 2180 with 15% plasticizer and then slightly down to 1900 with 25% plasticizer. Thus, the heat-interaction of butyl rubber with a fine thermal carbon black in the presence of Polyac as heat-interaction promotor and the use of a plasticizer, gives an unexpected increase in tensile strength regardless of whether the plasticizer is added before or after the heat-interaction.

In order to show the effectiveness of ester plasticizers, instead of the mineral oil used in the tests described above, another series of 6 tests was made in which trioctyl phosphate was used in concentrations of from 5 to 25 parts per 100 of butyl rubber, using an otherwise similar master batch as in the tests just described, namely with P-33 thermal black, and Polyac as heat-interaction promotor. In these tests the trioctyl phosphate plasticizer was added after the heat-interaction, and the compositions were all cured the same as those described.

The modulus (300%), tensile strength and elongation test results are shown in the following Table 4.

Table 4

| Butyl Rubber (100 parts) P-33 | 1 | 2 | 3 | 4 | 5 | 6 |
|---|---|---|---|---|---|---|
| Trioctyl Phosphate (parts) | 0 | 5 | 10 | 15 | 20 | 25 |
| 300% Modulus | 600 | 460 | 380 | 340 | 310 | 270 |
| Tens. Str | 1,565 | 2,135 | 2,245 | 2,300 | 2,150 | 2,070 |
| Elongation | 580 | 640 | 690 | 715 | 730 | 750 |

The tensile strength data in the above Table 4 are also set forth graphically as curve B in FIGURE 4. These data indicate that compared to a tensile strength of 1565 lbs./sq. in. for the unplasticized control sample, the corresponding figures for compositions containing 5 to 25% of trioctyl phosphate increased from 2135 with 5% plasticizer up to 2300 with 15% plasticizer and then reduced slightly to 2070 with 25% of plasticizer. These all show great increases over the control, in contrast to the usual reduction in tensile strength obtained when either mineral oil or ester plasticizers are incorporated into rubber compositions.

It is not intended that this invention be limited to the specific examples and modifications which have been given merely for the sake of illustration but only by the appended claims in which it is intended to claim all novelty inherent in the invention as well as all modifications coming within the scope and spirit of the invention.

What is claimed is:

1. A process which comprises mixing about 100 parts by weight of a butyl rubber comprising a copolymer of about 90 to 99 weight percent of isobutylene and about 10 to 1% of isoprene having a Staudinger molecular weight of about 20,000 to 100,000, about 20 to 150 parts by weight of a fine thermal carbon black having a pH of about 7 to 9 and an arithmetic product of about:

$$\frac{\text{Acres/lb.} \times \text{structure index}}{\text{pH}} = 5 \text{ to } 30$$

and about 0.1 to 1.0 part by weight of a heat-interaction promoter selected from the group consisting of sulfur, dinitroso benzenes, quinone dioximes and mixtures thereof, but in the absence of additional vulcanizing agents and vulcanization accelerators, and heat-interacting the resulting mixture at a temperature level of about 250° to 450° F. for a number of minutes equal to about:

$$\frac{2,000 \text{ (with agitation) to } 50,000 \text{ (without agitation)}}{\text{Temp. (° F.)} - 210}$$

then mixing into the resulting composition about 1 to 100 parts by weight of a non-volatile inert liquid plasticizer and vulcanizing the resulting plasticized heat-interacted composition at an elevated temperature in the presence of additional curatives until the vulcanizate formed exhibits an increase in tensile strength of about 50 to 300% compared to the same composition which had not been heat-interacted prior to vulcanization, and exhibits substantially higher tensile strength than corresponding heat-interacted and vulcanized compositions without any plasticizer liquid.

2. Process according to claim 1, using p-dinitroso benzene as heat-interaction promoter.

3. Process according to claim 1, using sulfur as heat-interaction promoter.

4. Process according to claim 1 which results in a vulcanizate exhibiting a tensile strength of about 43–88% higher than corresponding heat-interacted and vulcanized compositions without any plasticizer liquid.

5. A process according to claim 1 using about 40 to 80 parts by weight of the fine thermal carbon black and about 5 to 30 parts by weight of the plasticizer per 100 parts by weight of the butyl rubber, and curing the composition with at least one additional curative comprising tetramethyl thiuram disulfide.

6. Process according to claim 5 in which said accelerator is the sole accelerator.

7. Process according to claim 5 in which benzothiazyl disulfide is also used as accelerator.

8. Process according to claim 5 in which the plasticizer is a paraffinic oil having a viscosity of about 40 seconds Saybolt at 210° F.

9. A process which comprises mixing about 100 parts by weight of butyl rubber which is an olefin-multiolefin copolymer having an iodine number of about 0.5 to 50, and having a Staudinger mol. wt. above 20,000, about 20 to 150 parts by weight of a thermal carbon black having a pH of about 7 to 9 and a surface area of about 1 to 3 acres per pound, about 1 to 100 parts by weight of a non-volatile liquid plasticizer and about 0.1 to 1.0 part by weight of a heat-interaction promoter selected from the group consisting of sulfur, dinitroso benzenes, quinone dioximes, and mixtures thereof, and heat interacting the resulting mixture in the absence of additional vulcanization accelerators and vulcanizing agents at a temperature level of about 250° to 450° F. and for a number of minutes equal to about:

$$\frac{2,000 \text{ (with agitation) to } 50,000 \text{ (without agitation)}}{\text{Temp. (° F.)} - 210}$$

until the resulting heat-interacted composition upon subsequent addition of curing agents and vulcanizing at about 307° F. for about 30–50 minutes results in a vulcanizate exhibiting an increase in tensile strength of about 50 to 300% compared to the same composition which had not been heat interacted prior to vulcanization, and exhibiting substantially higher tensile strength than corresponding heat-interacted and vulcanized compositions without any plasticizer liquid.

10. Process according to claim 9 carried out by incorporating into the composition a non-volatile, inert, liquid hydrocarbon plasticizer.

11. Process according to claim 9 which results in a vulcanizate exhibiting a tensile strength of about 43–88% higher than corresponding heat-interacted and vulcanized compositions without any plasticizer liquid.

12. Process according to claim 9 carried out by incorporating into the composition a non-volatile inert liquid ester plasticizer.

13. A composition comprising about 1 to 100 parts by weight of a non-volatile liquid plasticizer, about 20 to 150 parts by weight of a thermal carbon black having a pH of about 7 to 9 and a surface area of about 1 to 3 acres per pound, about 100 parts by weight of butyl rubber which is an olefin-multiolefin copolymer having an iodine number of about 0.5 to 50 and having a Staudinger mol. wt. above 20,000, and about 0.1 to 1.0 part by weight of a heat interaction promoter selected from the group consisting of sulfur, dinitroso benzenes, quinone dioximes, and mixtures thereof.

14. A compounded and vulcanized synthetic rubber composition comprising the product obtained by vulcanizing a composition comprising about 100 parts by weight of butyl rubber comprising a copolymer of about 90 to 99 weight percent of isobutylene and about 10 to 1% of isoprene having a Staudinger molecular weight of about 20,000 to 100,000, about 20 to 150 parts by weight of a thermal carbon black having a pH of about 7 to 9, a surface area of about 1 to 3 acres per pound, and an arithmetic product of about:

$$\frac{\text{Acres/lb.} \times \text{structure index}}{\text{pH}} = 5 \text{ to } 30$$

and about 1 to 30 parts by weight of a non-volatile inert liquid organic plasticizer, said butyl rubber and carbon black being heat interacted in the presence of about 0.1 to 1.0 part by weight of a heat-interaction promoter selected from the group consisting of sulfur, dinitroso benzenes, quinone dioximes and mixtures thereof, but in the absence of additional vulcanization accelerators and vulcanizing agents at a temperature level of about 250° to 450° F. for a number of minutes equal to about:

$$\frac{2,000 \text{ (with agitation) to } 50,000 \text{ (without agitation)}}{\text{Temp. (° F.)} - 210}$$

until, upon curing, the vulcanizate produced exhibits an increase in tensile strength of about 50 to 300% compared to the same composition which had not been heat interacted prior to vulcanization, and exhibits substantially higher tensile strength corresponding heat-interacted and vulcanized compositions without any placticizer liquid.

15. Composition according to claim 14 having been vulcanized by the use of tetramethyl thiuram disulfide as sole vulcanization accelerator.

16. Vulcanized composition according to claim 14 exhibiting a tensile strength of about 43–88% higher than corresponding heat-interacted and vulcanized compositions without any plasticizer liquid.

17. Composition according to claim 16 in which said plasticizer had been present during said heat interaction.

18. Composition according to claim 16 in which said plasticizer had been added after said heat interaction.

References Cited in the file of this patent

UNITED STATES PATENTS

| | | |
|---|---|---|
| 2,526,504 | Rehner et al. | Oct. 17, 1950 |
| 2,615,856 | Bloch | Oct. 28, 1952 |
| 2,676,944 | Doak | Apr. 27, 1954 |
| 2,702,286 | Iknayan et al. | Feb. 15, 1955 |
| 2,811,502 | Gessler et al. | Oct. 29, 1957 |